(12) United States Patent
Veyland et al.

(10) Patent No.: US 8,877,839 B2
(45) Date of Patent: Nov. 4, 2014

(54) RUBBER COMPOSITION INCLUDING AN EXPOXIDE RESIN

(75) Inventors: Anne Veyland, Marsat (FR); Vincent Hunault, Les Martres D'Artieres (FR); Jose Carlos Araujo Da Silva, Pont Du Chateau (FR)

(73) Assignees: Compagnie Generale des Etablissements Michelin, Clermont (FR); Michelin Recherche et Techniques S.A., Granges-Paccot (CH)

( * ) Notice: Subject to any disclaimer, the term of this patent is extended or adjusted under 35 U.S.C. 154(b) by 86 days.

(21) Appl. No.: 13/502,341

(22) PCT Filed: Oct. 13, 2010

(86) PCT No.: PCT/EP2010/065339
§ 371 (c)(1),
(2), (4) Date: Jul. 27, 2012

(87) PCT Pub. No.: WO2011/045342
PCT Pub. Date: Apr. 21, 2011

(65) Prior Publication Data
US 2012/0283360 A1 Nov. 8, 2012

(30) Foreign Application Priority Data
Oct. 14, 2009 (FR) ...................................... 09 57186

(51) Int. Cl.
| | |
|---|---|
| C08L 63/00 | (2006.01) |
| C08L 7/00 | (2006.01) |
| C08L 9/00 | (2006.01) |
| C08L 21/00 | (2006.01) |
| C08L 61/04 | (2006.01) |
| C08K 5/17 | (2006.01) |

(52) U.S. Cl.
CPC .................. C08L 9/00 (2013.01); Y02T 10/862 (2013.01); C08L 61/04 (2013.01); C08L 63/00 (2013.01); C08K 5/17 (2013.01); C08L 7/00 (2013.01); C08L 21/00 (2013.01)
USPC .......................................... 523/467; 523/468

(58) Field of Classification Search
USPC .................................. 524/575; 523/467, 468
See application file for complete search history.

(56) References Cited

FOREIGN PATENT DOCUMENTS

JP    2008 144044    6/2008

OTHER PUBLICATIONS

Machine translation of Yokahama Rubber Co. (JP 208-144044) (original listed in IDS by Applicant).*

* cited by examiner

Primary Examiner — Ling Choi
Assistant Examiner — Catherine S Branch
(74) Attorney, Agent, or Firm — Cozen O'Connor

(57) ABSTRACT

A rubber composition which can be used in particular in tires, based on at least one diene elastomer, one reinforcing filler, one crosslinking system, between 1 and 20 phr of an epoxide resin and between 1 and 15 phr of an amine-comprising curing agent. The pair formed of epoxide resin with an amine-comprising curing agent advantageously replaces the pair formed of phenolIformaldehyde resin, which is a methylene acceptor, with the curing agent(s) HMT or H3M, which are conventional methylene donors. The use of this pair of reactants, epoxide resin and amine-comprising curing agent, makes it possible to obtain rubber compositions exhibiting a greater low-strain stiffness in comparison with conventional rubber compositions, without significantly damaging the hysteresis. Moreover, the combination of a phenolic resin, which is a methylene acceptor, with HMT or H3M, which is a methylene donor, produces formaldehyde during the vulcanization of the rubber composition. In point of fact, it is desirable to reduce, indeed even in the long run to eliminate, the formaldehyde of rubber compositions due to the environmental impact of this compound.

11 Claims, No Drawings

US 8,877,839 B2

RUBBER COMPOSITION INCLUDING AN EXPOXIDE RESIN

RELATED APPLICATIONS

This is a U.S. national stage of application No. PCT/EP2010/065339, filed Oct. 13, 2010.

This application claims the priority of French application Ser. No. 09/57186 filed Oct. 14, 2009, the entire content of which is hereby incorporated by reference.

FIELD OF THE INVENTION

The present invention relates to rubber compositions intended in particular for the manufacture of tires or semifinished products for tires, in particular rubber compositions exhibiting a high stiffness.

BACKGROUND OF THE INVENTION

It is known to use, in some parts of the tires, rubber compositions exhibiting a high stiffness during small deformations of the tire (cf. WO 02/10269). The resistance to small deformations is one of the properties which a tire has to exhibit in order to respond to the stresses to which it is subjected.

This stiffening can be obtained by increasing the level of reinforcing filler or by incorporating certain reinforcing resins in the constituent rubber compositions of the parts of the tire.

However, in a known way, the increase in the stiffness of a rubber composition by increasing the level of filler can be disadvantageous to the hysteresis properties and thus rolling resistance properties of the tires. In point of fact, it is an ongoing aim to lower the rolling resistance in order to reduce the consumption of fuel and thus to protect the environment.

Conventionally, this increase in stiffness is obtained by incorporating reinforcing resins based on a methylene acceptor/donor system. The terms "methylene acceptor" and "methylene donor" are well known to a person skilled in the art and are widely used to denote compounds capable of reacting together to generate, by condensation, a three-dimensional reinforcing resin which will become superimposed and interpenetrated with the reinforcing filler/elastomer network, on the one hand, and with the elastomer/sulphur network, on the other hand (if the crosslinking agent is sulphur). The methylene acceptor described above is combined with a curing agent, capable of crosslinking or curing it, also commonly known as "methylene donor". Crosslinking of the resin is then brought about during the curing of the rubber matrix by formation of bridges (—$CH_2$—) between the carbons in the ortho and para positions of the phenolic nuclei of the resin and the methylene donor, thus creating a three-dimensional resin network.

Conventionally, the methylene acceptor is a phenolic resin. Phenolic novolac resins have already been described in rubber compositions, intended in particular for tires or tire treads, for applications as diverse as adhesion or reinforcement: reference will be made, for example, to the document EP 0 649 446 B1.

Conventionally, the methylene donors are hexamethylenetetramine (abbreviated to HMT) or hexamethoxymethylmelamine (abbreviated to HMMM or H3M) or hexaethoxymethyl-melamine.

Unexpectedly, the Applicant Companies have discovered, during their research, that the pair formed of epoxide resin with an amine-comprising curing agent advantageously replaces the pair formed of phenol/formaldehyde resin, which is a methylene acceptor, with the curing agent(s) HMT or H3M, which are conventional methylene donors. The use of this pair of reactants, epoxide resin and amine-comprising curing agent, makes it possible to obtain rubber compositions exhibiting a greater low-strain stiffness in comparison with conventional rubber compositions, without significantly damaging the hysteresis.

Moreover, the combination of a phenolic resin, which is a methylene acceptor, with HMT or H3M, which is a methylene donor, produces formaldehyde during the vulcanization of the rubber composition. In point of fact, it is desirable to reduce, indeed even in the long run to eliminate, the formaldehyde of rubber compositions due to the environmental impact of this compound.

SUMMARY OF THE INVENTION

One object of the invention is to provide a rubber composition based on at least one diene elastomer, one reinforcing filler, one crosslinking system, between 1 and 20 phr of an epoxide resin and between 1 and 15 phr of an amine-comprising curing agent.

Another object of the invention is to provide tires or semifinished products for tires comprising a rubber composition in accordance with an embodiment of the invention.

Another object of the invention is to provide finished or semifinished rubber articles comprising a rubber composition in accordance with an embodiment of the invention.

The tires in accordance with the invention are intended in particular for passenger vehicles as for two-wheel vehicles (motorcycle, bicycle), industrial vehicles chosen from vans, heavy-duty vehicles, i.e., underground, bus, heavy road transport vehicles (lorries, tractors, trailers), off-road vehicles, agricultural vehicles, earth moving equipment, aircraft, or other transportation or handling vehicles.

The invention and its advantages will be easily understood in the light of the description and implementational examples which follow.

DETAILED DESCRIPTION

I—Tests

The rubber compositions are characterized as indicated below.

I.1—Dynamic Properties

The dynamic properties $G^*(10\%)$ and $\tan(\delta)_{max}$ at 40° C. are measured on a viscosity analyser (Metravib VA4000) according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, under the standard temperature conditions (23° C.) according to Standard ASTM D 1349-99, or, as the case may be, at a different temperature, is recorded. A strain amplitude sweep is carried out from 0.1 to 50% (outward cycle) and then from 50 to 1% (return cycle). The results made use of are the complex dynamic shear modulus $G^*$ and the loss factor $\tan(\delta)$. The maximum value of $\tan(\delta)$ observed, denoted $\tan(\delta)_{max}$, and the complex dynamic shear modulus $G^*(10\%)$ at 10% strain, at 40° C., are shown for the return cycle.

It should be remembered that, in a way well known to a person skilled in the art, the value of $\tan(\delta)_{max}$ at 40° C. is representative of the hysteresis of the material and thus of the rolling resistance: the lower the $\tan(\delta)_{max}$ at 40° C., the lower the rolling resistance.

II—Conditions for the Implementation of the Invention

The rubber composition according to the invention is based on at least:
- one diene elastomer;
- one reinforcing filler;
- one crosslinking system;
- between 1 and 20 phr of an epoxide resin;
- between 1 and 15 phr of an amine-comprising curing agent.

The expression composition "based on" should be understood as meaning a composition comprising the mixture and/or the reaction product of the various constituents used, some of these base constituents being capable of reacting or being intended to react with one another, at least in part, during the various phases of manufacture of the composition, in particular during the crosslinking or vulcanization thereof.

In the present description, unless expressly indicated otherwise, all the percentages (%) shown are percentages (%) by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II.1—Diene Elastomer

The rubber composition according to the invention comprises a diene elastomer.

The term "diene" elastomer or rubber should be understood as meaning, in a known way, an (one or more are understood) elastomer resulting at least in part (i.e. a homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:
- (a)—any homopolymer obtained by polymerization of a conjugated diene monomer having from 4 to 12 carbon atoms;
- (b)—any copolymer obtained by copolymerization of one or more conjugated dienes with one another or with one or more vinylaromatic compounds having from 8 to 20 carbon atoms;
- (c)—a ternary copolymer obtained by copolymerization of ethylene and of an α-olefin having 3 to 6 carbon atoms with a nonconjugated diene monomer having from 6 to 12 carbon atoms, such as, for example, the elastomers obtained from ethylene and propylene with a nonconjugated diene monomer of the abovementioned type, such as, in particular, 1,4-hexadiene, ethylidenenorbornene or dicyclopentadiene;
- (d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$-alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstirene, the "vinyltoluene" commercial mixture, para-(tert-butyl)stirene, methoxystirenes, chlorostirenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential blocks and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol functional groups or polysiloxane functional groups having a silanol end (such as described, for example, in FR 2 740 778 or U.S. Pat. No. 6,013,718 and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973, WO 2009/000750 and WO 2009/000752). Mention may also be made, as other examples of functionalized elastomers, of the elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/stirene copolymers and in particular those having a Tg (glass transition temperature measured according to ASTM D3418) of between 0° C. and −70° C. and more particularly between −10° C. and −60° C., a stirene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/stirene copolymers, in particular those having a stirene content of between 5% and 50% by weight and a Tg of between −5° C. and −50° C. In the case of butadiene/stirene/isoprene copolymers, those having a stirene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2- plus 3,4-units of the isoprene part of between 5% and 70% and a content (molar %) of trans-1,4-units of the isoprene part of between 10% and 50%, and more generally any butadiene/stirene/isoprene copolymer having a Tg of between −5° C. and −70° C., are suitable in particular.

To sum up, the diene elastomer of the composition according to the invention is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/stirene copolymers (SBR), isoprene/butadiene copolymers (BIR), isoprene/stirene copolymers (SIR) and isoprene/butadiene/stirene copolymers (SBIR).

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate stirene content, for example of between 20% and 35% by weight, or a high stirene content, for example of 35% to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

The term "isoprene elastomer" is understood to mean, in a known way, an isoprene homopolymer or copolymer, in other words a diene elastomer chosen from the group consisting of natural rubber (NR) which can be plasticized or peptized, synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRs, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

According to a specific embodiment of the invention, the rubber composition comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition according to the invention comprises a blend of a BR (as low Tg elastomer) exhibiting a level (molar %) of cis-1,4-structures of greater than 90% with one or more S-SBRs or E-SBRs (as high Tg elastomers).

The compositions of the invention can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II-2.—Reinforcing Filler

Use may be made of any type of reinforcing filler known for its capabilities of reinforcing a rubber composition which can be used for the manufacture of tires, for example an organic filler, such as carbon black, or a reinforcing inorganic filler, such as silica, or a blend of these two types of filler, in particular a blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated in an isoprene elastomer in the form of a masterbatch (see, for example, Applications WO 97/36724 and WO 99/16600).

Mention may be made, as examples of organic fillers other than carbon blacks, of the functionalized polyvinyl organic fillers as described in Applications WO-A-2006/069792, WO-A-2006/069793, WO-A-2008/003434 and WO-A-2008/003435.

The term "reinforcing inorganic filler" should be understood, in the present patent application, by definition, as meaning any inorganic or mineral filler (whatever its colour and its origin, natural or synthetic), also known as "white" filler, "light" filler or even "non-black filler", in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 m$^2$/g, preferably from 30 to 400 m$^2$/g. Mention will be made, as highly dispersible ("HDS") precipitated silicas, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

The reinforcing inorganic filler used, in particular if it is silica, preferably has a BET surface of between 45 and 400 m$^2$/g, more preferably of between 60 and 300 m$^2$/g.

Preferably, the level of total reinforcing filler (carbon black and/or reinforcing inorganic filler, such as silica) is between 20 and 200 phr, more preferably between 30 and 150 phr, the optimum being in a known way different depending on the specific applications targeted: the level of reinforcement expected with regard to a bicycle tire, for example, is, of course, less than that required with regard to a tire capable of running at high speed in a sustained manner, for example a motor cycle tire, a tire for a passenger vehicle or a tire for a commercial vehicle, such as a heavy-duty vehicle.

According to a preferred embodiment of the invention, use is made of a reinforcing filler comprising between 30 and 150 phr, more preferably between 50 and 120 phr, of inorganic filler, particularly silica, and optionally carbon black; the carbon black, when it is present, is preferably used at a level of less than 20 phr, more preferably of less than 10 phr (for example, between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO03/002648 (or US2005/0016651) and WO03/002649 (or US2005/0016650).

"Symmetrical" silane polysulphides corresponding to the following general formula (I):

Z-A-S$_x$-A-Z, in which: (I)

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

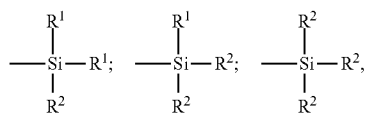

in which:
the R$^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the R$^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl),
are suitable in particular, without the above definition being limiting.

In the case of a mixture of alkoxysilane polysulphides corresponding to the above formula (I), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula [($C_2H_5O$)$_3$Si($CH_2$)$_3$S$_2$]$_2$, or bis (triethoxysilylpropyl) disulphide, abbreviated to TESPD, of formula [($C_2H_5O$)$_3$Si($CH_2$)$_3$S]$_2$. Mention will also be made, as preferred examples, of bis(mono($C_1$-$C_4$)alkoxyldi($C_1$-$C_4$) alkylsilylpropyl) polysulphides, (in particular disulphides, trisulphides or tetrasulphides), more particularly bis(monoethoxydimethylsilylpropyl) tetrasulphide, as described in Patent Application WO 02/083782 (or US2004/132880).

Mention will in particular be made, as coupling agent other than alkoxysilane polysulphide, of bifunctional POSs (polyorganosiloxanes) or of hydroxysilane polysulphides (R$^2$=OH in the above formula I), such as described in Patent Applications WO 02/30939 (or U.S. Pat. No. 6,774,255) and WO 02/31041 (or US2004/051210), or of silanes or POSs carrying azodicarbonyl functional groups, such as described, for example, in Patent Applications WO 2006/125532, WO 2006/125533 and WO 2006/125534.

In the rubber compositions in accordance with the invention, the content of coupling agent is preferably between 4 and 12 phr, more preferably between 4 and 8 phr.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

II.3—Epoxide Resin—Amine-Comprising Curing Agent

The composition according to the invention comprises between 1 and 20 phr of an epoxide resin which reacts with between 1 and 15 phr of an amine-comprising curing agent.

II.3.a—Epoxide Resin

The epoxide resins which are used in the present invention include all polyepoxide compounds, such as aromatic epoxide compounds, alicyclic epoxide compounds and aliphatic epoxide compounds. Preference is given in particular, among aromatic epoxide compounds, to novolac epoxy resins, 2,2-bis[4-(glycidyloxy)phenyl]propane, poly[(o-cresyl glycidyl ether)-co-formaldehyde] and the mixtures of these compounds.

The amount of epoxide resin is between 1 and 20 phr; below the minimum indicated, the technical effect targeted is inadequate, whereas, above the maximum indicated, the risks arise of an excessively great increase in the stiffness and of the hysteresis being excessively disadvantaged. For all these reasons, an amount of between 1 and 15 phr is preferably chosen.

II.3.b—Amine-Comprising Curing Agent

The epoxide resin of the composition of the invention is used in combination with an amine-comprising curing agent which makes possible the crosslinking of the resin.

Known curing agents are (poly)amine compounds, polyphenol compounds and cationic photoinitiators, in particular dicyandiainides, hydrazides, imidazole compounds, sulphonium salts, onium salts, ketimines or acid anhydrides, for example the polyanhydride 4,4'-(4,4'-isopropylidenediphenoxy)bis(phthalic anhydride) and pyromellitic dianhydride.

Polyamines are preferred in particular. The polyamine compounds include aliphatic polyamines, such as ethylenediamine, diethylenetriamine, triethylenetetramine and in particular 1,8-diaminooctane, alicyclic polyamines, such as 1,3-bis(aminomethyl)-cyclohexane, aliphatic amines having an aromatic ring, such as m-xylylenediamine or p-xylylenediamine, and aromatic polyamines, such as m-phenylenediamine, 2,2-bis(4-aminophenyl)propane, diaminodiphenylmethane, diaminodiphenyl sulphone, 2,2-bis(4-aminophenyl)-p-diisopropylbenzene and in particular 3,3'-diaminobenzidine.

The amount of amine-comprising curing agent is between 1 and 15 phr; below the minimum indicated, the technical effect targeted proved to be inadequate, whereas, above the maximum indicated, the risks arise of the processing in the raw state of the compositions being disadvantaged.

According to a preferred embodiment of the invention, the amine-comprising curing agent comprises at least two amine functional groups; preferably, use will be made, for example, of p-xylylenediamine, 1,3-bis(aminomethyl)cyclohexane, 1,8-diaminooctane or 3,3-diaminobenzidine.

II.4—Various Additives

The rubber compositions of the treads in accordance with the invention also comprise all or a portion of the usual additives generally used in elastomer compositions intended for the manufacture of treads, such as, for example, pigments, protection agents, such as antiozone waxes, chemical antiozonants, antioxidants, other plasticizing agents than those mentioned above, antifatigue agents, reinforcing resins, a crosslinking system based either on sulphur or on sulphur donors and/or on peroxide and/or on bismaleimides, vulcanization accelerators or vulcanization activators.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their processing property in the raw state, these agents being, for example, hydrolysable silanes, such as alkylalkoxy-silanes, polyols, polyethers, primary, secondary or tertiary amines, or hydroxylated or hydrolysable polyorganosiloxanes.

II.5—Preparation of the Rubber Compositions

The compositions used in the treads of the invention can be manufactured in appropriate mixers using two successive preparation phases well known to a person skilled in the art: a first phase of thermomechanical working or kneading ("nonproductive" phase) at high temperature, up to a maximum temperature of between 110° C. and 190° C., preferably between 130° C. and 180° C., followed by a second phase of mechanical working ("productive" phase) up to a lower temperature, typically of less than 110° C., for example between 40° C. and 100° C., finishing phase during which the crosslinking system is incorporated.

The process for preparing such compositions comprises, for example, the following stages:

incorporating a reinforcing filler in a diene elastomer during a first stage ("nonproductive" stage), everything being kneaded thermomechanically (for example, in one or more goes), until a maximum temperature of between 110° C. and 190° C. is reached;

cooling the combined mixture to a temperature of less than 100° C.;

subsequently incorporating, during a second stage ("productive" stage), a crosslinking system;

kneading everything up to a maximum temperature of less than 110° C.

Between 1 and 20 phr of the epoxide resin and between 1 and 15 phr of the amine-comprising curing agent can be introduced either during the nonproductive phase or during the productive phase. Preferably, the epoxide resin is introduced during the nonproductive phase and the curing agent during the productive phase.

By way of example, the nonproductive phase is carried out in a single thermomechanical stage during which, in a first step, all the necessary base constituents (a diene elastomer, reinforcing filler, and optionally between 1 and 20 phr of an epoxide resin and between 1 and 15 phr of an amine-comprising curing agent) are introduced into an appropriate mixer, such as a normal internal mixer, followed, in a second step, for example after mixing for one to two minutes, by the other additives, optional additional filler-covering agents or processing aids, with the exception of the crosslinking system. The total duration of the mixing, in this nonproductive phase, is preferably between 1 and 15 min.

After cooling the mixture thus obtained, the crosslinking system is then incorporated in an external mixer, such as an open mill, maintained at low temperature (for example, between 40° C. and 100° C.). The combined mixture is then mixed (productive phase) for a few minutes, for example between 2 and 15 min.

The crosslinking system proper is preferably based on sulphur and on a primary vulcanization accelerator, in particular on an accelerator of the sulphenamide type. Added to this vulcanization system are various known vulcanization activators or secondary accelerators, such as zinc oxide, stearic acid, guanidine derivatives (in particular diphenylguanidine), and the like, incorporated during the first nonproductive phase and/or during the productive phase. The level of sulphur is preferably between 0.5 and 10.0 phr and that of the primary accelerator is preferably between 0.5 and 5.0 phr.

Use may be made, as accelerator (primary or secondary) of any compound capable of acting as accelerator of the vulcanization of diene elastomers in the presence of sulphur, in particular accelerators of the thiazole type and their derivatives, accelerators of thiuram type or zinc dithiocarbamates. These accelerators are more preferably chosen from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-tert-butyl-2-benzothiazolesulphenimide (abbreviated to "TBSI"), zinc dibenzyldithiocarbamate (abbreviated to "ZBEC") and the mixtures of these compounds. Use is preferably made of a primary accelerator of the sulphenamide type.

The final composition thus obtained can subsequently be calendered, for example in the form of a sheet or of a plaque, in particular for characterization in the laboratory, or else extruded, for example to form a rubber profiled element used in the manufacture of a tire.

The invention relates to the tires and semifinished products for tires described above and to rubber articles, both in the raw state (that is to say, before curing) and in the cured state (that is to say, after crosslinking or vulcanization).

II.6—Tire of the Invention

The rubber composition according to the invention can be used in various parts of the tire, in particular in the crown, the bead area and the sidewall area.

According to a preferred embodiment of the invention, the rubber composition described above can be used in the tire as a stiff elastomer layer in at least one part of the tire.

The term elastomer "layer" is understood to mean any three-dimensional component, composed of rubber (or "elastomer", the two being regarded as synonyms), of any shape and thickness, in particular sheet, strip or other component of any cross section, for example rectangular or triangular.

First of all, the elastomer layer can be used as underlayer positioned in the crown of the tire, between, on the one hand, the tread, i.e., the portion intended to come into contact with the road during running, and, on the other hand, the belt which reinforces the said crown. The thickness of this elastomer layer is preferably within a range extending from 0.5 to 10 mm, in particular within a range from 1 to 5 mm.

According to another preferred embodiment of the invention, the rubber composition according to the invention can be used to form an elastomer layer, positioned in the area of the bead of the tire, radially between the carcass ply, the bead thread and the turn-up of the carcass ply.

Another preferred embodiment of the invention can be the use of the composition according to the invention to form an elastomer layer positioned in the area of the sidewall of the tire.

III—Implementational Examples of the Invention

III.1—Preparation of the Compositions

The procedure for the tests which follow is as follows: the diene elastomer, the reinforcing filler, between 1 and 20 phr of the epoxide resin, and also the various other ingredients, with the exception of the vulcanization system, are successively introduced into an internal mixer (final degree of filling: approximately 70% by volume), the starting vessel temperature of which is approximately 60° C. Thermomechanical working is then carried out (nonproductive phase) in one stage, which lasts in total approximately from 3 to 4 min, until a maximum "dropping" temperature of 165° C. is reached.

The mixture thus obtained is recovered and cooled, and then sulphur, an accelerator of sulphenamide type and between 1 and 15 phr of the amine-comprising curing agent are incorporated on a mixer (homofinisher) at 30° C., everything being mixed (productive phase) for an appropriate time (for example, between 5 and 12 min).

The compositions thus obtained are subsequently calendered, either in the form of plaques (thickness of 2 to 3 mm) or of thin sheets of rubber, for the measurement of their physical or mechanical properties, or extruded in the form of a profiled element.

III.2—Tests on Rubber Compositions

This test illustrates rubber compositions which can be used in particular in an underlayer or in a bottom area of a tire, which areas require a high low-strain stiffness. These compositions do not result in the formation of formaldehyde during the curing and exhibit a greater stiffness than a conventional rubber composition (comprising a phenolic resin and HMT as methylene donor), while retaining a similar level of hysteresis.

For this, five rubber compositions were prepared as indicated above, four in accordance with the invention (denoted C.2 to C.5 hereinbelow) and one not in accordance (control composition, denoted C.1 hereinbelow). Their formulations (in phr or parts by weight per hundred parts of elastomer) and their mechanical properties have been summarized in the appended Tables 1 and 2.

The compositions of the invention C.2 to C.5 comprise an epoxide resin and a polyamine curing agent as replacement for the phenol/formaldehyde resin-HMT curing agent(s) pair present in the conventional control composition C.1. The polyamine curing agent is different for each of the compositions according to the invention, respectively 3,3'-diaminobenzidine, p-xylylenediamine, 1,3-bis(amninomethyl)cyclohexane and 1,8-diaminooctane for the compositions from C.2 to C.5.

It should be noted that the replacement of the phenol/formaldehyde resin-HMT curing agent(s) pair by an epoxide resin and a polyamine curing agent in the compositions of the invention C.2 to C.5 makes it possible to obtain a complex dynamic shear modulus G*(10%) at 40° C. which is greater than that of the control composition C.1, representative of an increase in the low-strain stiffness of the compositions according to the invention, while reconciling an increase in the loss factor at 40° C. (denoted $\tan(\delta)_{max}$), that is to say a slight increase in the hysteresis which remains acceptable, in particular in certain areas of the tire, in particular in the bottom area and in the underlayer.

To sum up, the results of these tests demonstrate that the use of an epoxide resin and a polyamine curing agent in the compositions of the invention makes it possible to obtain rubber compositions with a greater low-strain stiffness than that of a conventional composition (in this case the control composition), synonymous with an improvement in the road performance, while retaining an acceptable hysteresis, in particular in certain areas of the tire, in particular in the bottom area and in the underlayer.

TABLE 1

| Constituent | C.1 | C.2 | C.3 | C.4 | C.5 |
|---|---|---|---|---|---|
| NR (1) | 100 | 100 | 100 | 100 | 100 |
| Carbon black (2) | 70 | 70 | 70 | 70 | 70 |
| Phenol/formaldehyde resin (3) | 12 | — | — | — | — |
| Epoxide resin (4) | — | 12 | 12 | 12 | 12 |
| ZnO (5) | 3 | 3 | 3 | 3 | 3 |
| Stearic acid (6) | 2 | 2 | 2 | 2 | 2 |
| 6PPD (7) | 2.5 | 2.5 | 2.5 | 2.5 | 2.5 |
| HMT (8) | 4 | — | — | — | — |
| 3,3'-Diaminobenzidine (9) | — | 4 | — | — | — |
| p-Xylylenediamine (10) | — | — | 4 | — | — |
| 1,3-Bis(aminomethyl)cyclohexane (11) | — | — | — | 4 | — |

TABLE 1-continued

| Constituent | C.1 | C.2 | C.3 | C.4 | C.5 |
|---|---|---|---|---|---|
| 1,8-Diaminooctane (12) | — | — | — | — | 4 |
| Sulphur | 3 | 3 | 3 | 3 | 3 |
| CBS (13) | 2 | 2 | 2 | 2 | 2 |

(1) Natural rubber;
(2) Carbon black N326 (name according to Standard ASTM D-1765);
(3) Phenol/formaldehyde resin ("Peracit 4536K" from Perstorp);
(4) Epoxide resin ("DEN 439" from Uniqema);
(5) Zinc oxide (industrial grade - Umicore);
(6) Stearin ("Pristerene 4931" from Uniqema);
(7) N-(1,3-Dimethylbutyl)-N-phenyl-para-phenylenediamine (Santoflex 6-PPD from Flexsys);
(8) Hexamethylenetetramine (from Degussa);
(9) 3,3'-Diaminobenzidine (from Sigma-Aldrich);
(10) p-Xylylenediamine (from Sigma-Aldrich);
(11) 1,3-Bis(aminomethyl)cyclohexane (from Sigma-Aldrich);
(12) 1,8-Diaminooctane (from Sigma-Aldrich);
(13) N-Cyclohexyl-2-benzothiazolesulphenamide (Santocure CBS from Flexsys).

TABLE 2

| | Composition No. | | | | |
|---|---|---|---|---|---|
| | C.1 | C.2 | C.3 | C.4 | C.5 |
| $G^*$ (10%) at 40° C. | 6.8 | 7.2 | 8.2 | 7.4 | 7.7 |
| $\tan(\delta)_{max}$ at 40° C. | 0.25 | 0.31 | 0.28 | 0.29 | 0.32 |

The invention claimed is:

1. A rubber composition based on at least:
   one diene elastomer;
   one reinforcing filler;
   one crosslinking system;
   between 1 and 20 phr of an epoxide; and
   between 1 and 15 phr of an amine-comprising curing agent,
   wherein the amine-comprising curing agent comprises at least two amine functional groups, and
   wherein the amine-comprising curing agent is chosen from the group consisting of p-xylylenediamine, 1,3-bis(aminomethyl)cyclohexane, 1,8-diaminooctane, 3,3'-diaminobenzidine and the mixtures of these compounds.

2. The rubber composition according to claim 1, wherein the elastomer is chosen from the group consisting of natural rubber, synthetic polyisoprenes, polybutadienes, butadiene copolymers, isoprene copolymers and the mixtures of these elastomers.

3. The rubber composition according to claim 1, wherein the level of epoxide resin is between 1 and 15 phr.

4. The rubber composition according to claim 1, wherein the reinforcing filler comprises carbon black, silica or a mixture of carbon black and silica.

5. The rubber composition according to claim 1, wherein the amount of reinforcing filler is between 20 and 200 phr.

6. A tire, comprising a rubber composition according to claim 1.

7. A finished or semifinished rubber article comprising a rubber composition according to claim 1.

8. A process for preparing a rubber composition according claim 1, comprising the steps of:
   incorporating a reinforcing filler, between 1 and 20 phr of an epoxide resin and between 1 and 15 phr of an amine-comprising curing agent in a diene elastomer during a first stage ("nonproductive" stage), everything being kneaded thermomechanically until a maximum temperature of between 110° C. and 190° C. is reached;
   cooling the combined mixture to a temperature of less than 100° C.;
   subsequently incorporating, during a second stage ("productive" stage), a crosslinking system; and
   kneading everything up to a maximum temperature of less than 110° C.

9. A process for preparing a rubber composition according to claim 1, comprising the steps of:
   incorporating a reinforcing filler in a diene elastomer during a first stage ("nonproductive" stage), everything being kneaded thermomechanically until a maximum temperature of between 110° C. and 190° C. is reached;
   cooling the combined mixture to a temperature of less than 100° C.;
   subsequently incorporating, during a second stage ("productive" stage), a crosslinking system, between 1 and 20 phr of an epoxide resin and between 1 and 15 phr of an amine-comprising curing agent; and
   kneading everything up to a maximum temperature of less than 110° C.

10. A process for preparing a rubber composition according to claim 1, comprising the steps of:
    incorporating a reinforcing filler and between 1 and 20 phr of an epoxide resin in a diene elastomer during a first stage ("nonproductive" stage), everything being kneaded thermomechanically until a maximum temperature of between 110° C. and 190° C. is reached;
    cooling the combined mixture to a temperature of less than 100° C.;
    subsequently incorporating, during a second stage ("productive" stage), a crosslinking system and between 1 and 15 phr of an amine-comprising curing agent; and
    kneading everything up to a maximum temperature of less than 110° C.

11. A process for preparing a rubber composition according to claim 1, comprising the steps of:
    incorporating a reinforcing filler and between 1 and 15 phr of an amine-comprising curing agent in a diene elastomer during a first stage ("nonproductive" stage), everything being kneaded thermomechanically until a maximum temperature of between 110° C. and 190° C. is reached;
    cooling the combined mixture to a temperature of less than 100° C.;
    subsequently incorporating, during a second stage ("productive" stage), a crosslinking system and between 1 and 20 phr of an epoxide resin; and
    kneading everything up to a maximum temperature of less than 110° C.

* * * * *